UNITED STATES PATENT OFFICE.

PAUL PRETSCH, OF AUSTRIA.

PHOTO-GALVANOGRAPHIC PROCESS FOR PRINTING.

Specification forming part of Letters Patent No. 18,056, dated August 25, 1857.

*To all whom it may concern:*

Be it known that I, PAUL PRETSCH, of the Empire of Austria, have invented a new and improved mode of producing copper and other surfaces applicable for printing, embossing, and various useful and ornamental purposes; and I do hereby declare that the following is a full and exact description thereof.

My said invention consists in adapting the photographic process to the purpose of obtaining either a raised or a sunk design on glass or other suitable material or materials, covered with glutinous substances mixed with photographic materials, which aforesaid design can then be copied by the electrotype process or by other means for producing plates or metallic surfaces suitable for printing and other useful and ornamental purposes, or can be applied for producing molds applicable for obtaining similar objects.

I propose calling my said improvement the "photo-galvanographic process;" and to enable others skilled in the arts connected therewith to perform and use my invention, I will now proceed to describe the details of the several processes by which the same may be carried into operation.

I first prepare a solution of about two parts of clear glue in about ten parts of distilled water, using more or less of either, as may be required, and to one part of a strong solution of nitrate of silver and one part of a weak solution of iodide of potassium, each in a separate glass, I pour a small quantity of the glue solution. The remainder of the glue solution must be kept warm, and a very strong solution of bichromate of potassa well stirred up in it. I then add the prepared glutinous solutions of nitrate of silver and iodide of potassium, and strain the mixture for use. I next take a clean plate of glass or silvered copper-plate, or other suitable plate, and, placing it quite level, pour the above mixture over its surface, which will form a coating thereon when completely dry. The print or other subject to be copied being laid on the prepared coated surface, they are to be placed together in a photographic copying-frame and exposed to the influence of the light. After a sufficient exposure the frame must be opened, the plate removed and washed either with cold water or a solution of borax or of carbonate of soda, as may be necessary.

The photographic picture or design will be found to appear in relief, and when sufficiently developed must be washed with spirits of wine. The surplus moisture is to be removed and the plate covered with a mixture of copal varnish diluted with oil of turpentine. After some time, and before becoming quite dry, the superfluous varnish must be removed with oil of turpentine, and the plate immersed in a weak solution of tannin or other suitable astringent. During this part of the process the plate must be carefully watched and removed as soon as the picture or design is considered sufficiently raised. It is then washed in water and dried. In this state the plate is ready to be copied. This may be effected by the customary methods of rendering the coating conducting and placing it in the electrotype apparatus, or by making a mold from the coated plate, which, being subjected to the electrotype process, will also afford the required printing or other plates or objects; or the copying of some subjects may sometimes be done by the stereotype or like process; or, secondly, I proceed by employing a solution of gelatine prepared with chemicals as already described, with which I coat the plate and operate for copying the same as first detailed; but after washing with spirits of wine the plate must be dried, and in due time the picture or design will appear sunk like an engraved plate. The production of printing-plates or other subjects therefrom is to be proceeded with as before described; or a third process may be adopted by applying printing-ink to the coating of the plate prepared as above described, taking the impression upon paper laid thereon, which impression or print can be transferred to zinc or stone, and printed by the usual methods.

I employ plates engraved by my said process for the formation of cylinders to be used for calico-printing, embossing, and other purposes; or cylinders may be formed directly by the electrotype process by means of suitable tubular or like arrangements of my engraved plates, as a matrix, and the electrotype cylinder produced therefrom may be strengthened by the insertion of metal rollers, cast metal, and similar methods.

When metallic plates or manufactured articles have to be ornamented with engraving according to my said process the same can be variously applied to flat, curved, and other surfaces, and when required may be electrotyped, or may be inlaid with metals or other materials.

Having thus fully described several modes of proceeding to carry out the objects of my said improvements, I would here remark that the coated glass, metal, or other plates which I employ when taken from the photographic apparatus or copying-frame have flat surfaces, and therefore must be treated with water, alcohol, or solutions of borax and other like suitable chemical ingredients, by which means certain parts of the photographic copy will appear raised and others sunk, and is then ready to be made firm, if necessary, by applying astringents and drying-varnish. The surfaces thus prepared, or the molds prepared from them, are next made conducting, and must be placed in the galvano-plastic apparatus for obtaining an electrotype copy; or the same can be stereotyped or otherwise copied; also, instead of the iodide of potassium the ammonium bromide or ammonium iodide may be employed, as they shorten the time of exposure, and likewise the copy can then be obtained by the photographic camera instead of the copying-frame.

As my invention is capable of being variously modified, I do not restrict myself to the precise processes described, nor to any particular chemical ingredients or photographic or galvanic apparatus, so long as the objects of my improvements result substantially from employing the whole or any part of the same; and I do declare that

What I claim as my invention is—

The peculiar adaptation of the photographic process to the production of metallic and other surfaces suitable for printing, and for various other useful and ornamental purposes, as described, or substantial thereto.

PAUL PRETSCH.

Witnesses:
EDWD. B. ROBERTS,
CHS. DIRCKS.